(12) United States Patent
Höhn

(10) Patent No.: US 6,491,602 B1
(45) Date of Patent: Dec. 10, 2002

(54) DRIVE ASSEMBLY

(76) Inventor: Bernd-Robert Höhn, Sulzbacher Str. 2, Munich (DE), 80803

( * ) Notice: Subject to any disclaimer, the term of this patent is extended or adjusted under 35 U.S.C. 154(b) by 0 days.

(21) Appl. No.: 09/719,073

(22) PCT Filed: Mar. 25, 2000

(86) PCT No.: PCT/EP00/02654

§ 371 (c)(1),
(2), (4) Date: Jan. 8, 2001

(87) PCT Pub. No.: WO00/59750

PCT Pub. Date: Oct. 12, 2000

(30) Foreign Application Priority Data

Apr. 6, 1999 (DE) .......................... 199 1 370

(51) Int. Cl.[7] .............................................. B60K 41/02
(52) U.S. Cl. .................................. 477/5; 477/3; 74/661
(58) Field of Search ........................... 477/3, 5; 74/661; 180/65.2

(56) References Cited

U.S. PATENT DOCUMENTS

| | | | |
|---|---|---|---|
| 4,405,029 A | | 9/1983 | Hunt .......................... 180/65.2 |
| 4,469,187 A | | 9/1984 | Hagin et al. ............... 180/14.2 |
| 5,337,848 A | * | 8/1994 | Bader ........................ 180/65.2 |
| 5,644,200 A | * | 7/1997 | Yang .......................... 180/65.2 |
| 5,713,425 A | * | 2/1998 | Buschhaus et al. ........ 180/65.2 |
| 5,943,918 A | * | 8/1999 | Reed, Jr. et al. ............... 74/661 |
| 6,110,066 A | * | 8/2000 | Nedungadi et al. ............ 475/5 |
| 6,186,255 B1 | * | 2/2001 | Shimasaki et al. ......... 180/65.2 |
| 6,269,895 B1 | * | 8/2001 | Tanuguchi et al. ......... 180/65.2 |

FOREIGN PATENT DOCUMENTS

| | | |
|---|---|---|
| DE | 2943532 | 5/1981 |
| DE | 3231882 | 3/1984 |
| DE | 4342735 | 6/1995 |
| EP | 0082932 | 7/1983 |
| EP | 0445873 | 9/1991 |
| GB | 993185 | 5/1965 |
| GB | 1440484 | 6/1976 |
| GB | 2013149 | 8/1979 |

* cited by examiner

Primary Examiner—Matthew C. Graham
Assistant Examiner—Mariano Sy
(74) Attorney, Agent, or Firm—Stevens, Davis, Miller & Mosher, LLP

(57) ABSTRACT

The invention relates to a drive assembly, in particular for motor vehicles. Said assembly comprises a first drive source, in particular, an internal combustion engine and a second drive source, in particular, an electric motor. Said drive sources operate on a variable transmission as speed converters, whereby the first drive source is connected via a clutch to the transmission and the second drive source is connected directly to said transmission. In order to achieve an optimal construction in terms of form and function, the first drive source impinges upon a first conversion element of the variable transmission, the second drive source impinges upon the second conversion element and a separate drive shaft is provided which can be selectively coupled to the first or second conversion element.

17 Claims, 2 Drawing Sheets

DRIVE ASSEMBLY

Figure 1:
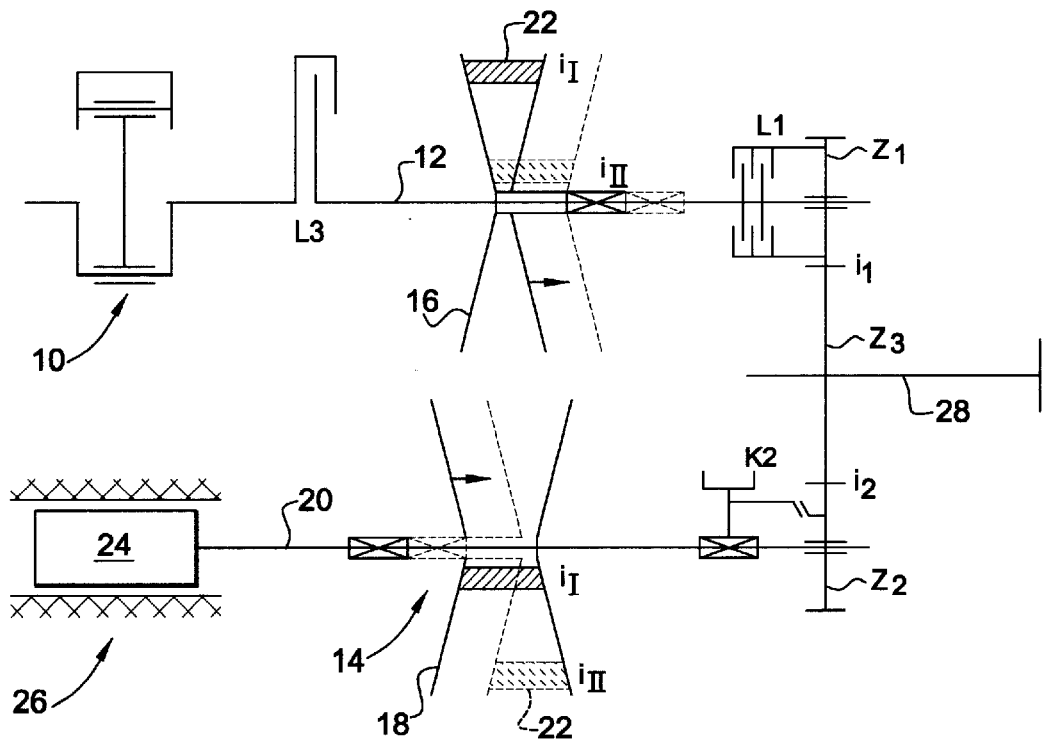

The invention relates to a drive assembly, for motor vehicles in particular, as specified in the preamble of claim 1, and also to a process for operating a motor vehicle with such a drive assembly.

A generic drive assembly is disclosed in DE 29 43 532 A1; it has an internal combustion engine as first drive source, an electric motor, as second drive source, and a belt contact transmission as infinitely variable transmission. In the process of operation the internal combustion engine activates, by way of a coupling, the first converter element and respectively the drive wheel pair of the, belt contact transmission, while the driven wheel pair driven by way of belt contact means is connected to the driven shaft as second converter element. The electric motor is also connected directly to the drive wheel pair for the purpose of propulsion. With this drive assembly, for example, the vehicle may be set in motion and driven in the low-speed range by the electric motor by utilizing the transmission spread. If the coupling is closed on the internal combustion engine side, the internal combustion engine may be additionally engaged, and if desired the electric motor may be converted to operation as a generator. The transmission spread may also be suitably passed through by way of the internal combustion engine.

The object of this invention is to develop the generic drive assembly at low additional cost and so as to be much more versatile and favorable with respect to the transmission spread.

It is claimed for the invention that this object is obtained with the characteristic features presented in claim 1. Advantageous developments of the invention are to be found in the additional claims. In addition, claims 8 to 12 propose an advantageous process for operation of a motor vehicle with the drive assembly claimed for the invention, whereby favorable drive shaft efficiency can be achieved and emission of noxious exhaust gases may be reduced in local traffic areas, and accordingly in urban traffic.

Application of the measures claimed for the invention as presented in claim 1 yields the special advantage that the infinitely variable speed-change gear (e.g., a toroidal or belt-contact transmission) is passed through when the force flow from the first or second drive force hereafter referred to as internal combustion engine and electric motor, is reversed, the following functions being possible by means of simple switching of couplings:

1. Propulsion by way of the electric motor only for starting both forward and reverse driving in urban areas;
2. Propulsion by way of the internal combustion engine only, at higher speeds only, but if desired also for starting (emergency operation);
3. Propulsion by way of both drive sources in extreme acceleration;
4. Starting of the internal combustion engine by means of the electric motor;
5. Engagement of the electric motor as generator to supply the electric network of the motor vehicle during internal combustion engine operation and if desired in braking of the motor vehicle; and
6. Propulsion of the motor vehicle by the internal combustion engine or the electric motor without infinitely variable transmission (emergency operation).

It is also particularly advantageous if propulsive connections, such as gears, chains, etc., are provided which differ with respect to their transmission ratios. In this instance the connection switching on the electric motor, preferably a first set of spur pinions, may be designed for a higher starting torque and a lower speed range, while the connection switching on the internal combustion engine to effect propulsion, and accordingly the pertinent gear set, may be optimally designed for high speeds of the motor vehicle up to fuel-conserving overdrive operation. This propulsive connection is regularly superimposed in each instance on the spread of the infinitely variable transmission.

Smooth switching of the drive sources accompanied by low clutch wear is also achieved if reversal of the force flow is effected in the infinitely variable transmission when the speed of the elements to be coupled is synchronous. Such synchronous speed is present as a function of the given transmission ratios for the propulsive connections with a specific transmission ratio assigned to the infinitely variable transmission and can be determined more or less precisely, for example, by means of engine speed sensors on the drive shafts.

The switchable couplings may be positive claw clutches, synchronized clutches, and/or friction clutches, mounted as determined by structural relationships on the driven shaft and/or the other two transmission shafts. In the force flow on the side of the internal combustion engine in particular a clutch (single-plate dry clutch or multiplate clutch) which may also be used as starting clutch should be provided in order to make driving of the motor vehicle by the internal combustion engine possible at least in emergency operation.

Claim 8 and following claims propose operation as follows of the drive assembly described:

When the gas pedal is depressed, first the electric motor is activated by an electronic control unit with an assigned performance-value transmitter as a function of speed and/or performance and the starting torque and speed are controlled by appropriate current control. Starting at a specific speed or higher required performance (full gas or kick-down actuation if desired), the internal combustion engine is connected and activated (ignited) and its performance set at a high value, if desired with simultaneous switching from electric motor operation to internal combustion engine operation (switching of the connectable propulsive connections accompanied by reversal of force flow in the infinitely variable transmission. In the process the electric motor may feed in additional power to advantage, or again, if performance required is lower, the electric motor may be switched to generator operation to supply the electric network of the motor vehicle.

By preference the different transmission ratios of the propulsive connections are designed so that in traffic areas where speed is restricted to 30 km/hr, for example, as a rule only the electric motor is used in such areas. As a result, stages of operation of the internal combustion engine partial load ranges unfavorable to efficiency and generation of noise and exhaust gas pollution are prevented to the greatest possible extent.

Several exemplary embodiments of the invention are explained in greater detail below. In the schematic drawing, FIG. 1 shows a drive assembly with an internal combustion engine, an electric motor, a belt-contact transmission, and the driven shaft with the propulsive connections connectable to the inlet or outlet of the belt-contact transmission, FIG. 2 a drive assembly shown in FIG. 1, but with two gears as connectable propulsive connections mounted on the driven shaft, FIG. 3 again a drive assembly as shown in FIG. 1 also with two gears mounted on the driven shaft as propulsive connections which may be connected by way of two multiple-disk clutches, and FIG. 4 a drive assembly with an internal combustion engine, an electric motor, a toroidal transmission, and propulsive connections connectable to the inlet or outlet of the toroidal transmission.

In FIG. 1, 10 denotes an internal combustion engine, which is connected by a friction contact $L_3$ to a first shaft 12 of the infinitely variable belt-contact gear 14.

The belt-contact gear 14 consists, as is known, of a first converter element or disk pair 16 on a shaft 12, a second converter element or disk pair 18 on a second shaft 20 mounted parallel to shaft 12, and belt contact means such as a chain 22 connecting the disk pairs 16, 18. The belt-contact radius of the chain 22 is appropriately adjustable, the conversion ratio $i_I$ converting to "fast" with the force flow direction extending from shaft 12 to shaft 20, that is, shaft 20 rotates faster than shaft 12, which conversion ratio $i_{II}$ converts to "slow" direction, shaft 12 rotating faster than shaft 20. Conversion is infinitely variable $i_I$ and $i_{II}$.

When the direction of force flow is from shaft 20 to shaft 12, conversion $i_I$ is to slow and $i_{II}$ to fast.

The rotor 24 of an electric motor 26, which may be a rotary-current motor, for example, acts directly on the second shaft 20 of the belt-contact gear 14.

In addition, there is mounted on shaft 12 a gear $Z_1$ which may be coupled by way of a multi-plate clutch $L_1$ and meshes with a gear $Z_3$ on a driven shaft 28 mounted parallel to shafts 12, 20; a connectable propulsive connection with conversion ratio $i_I$ is thereby formed.

Similarly, there is mounted rotatably on shaft 20 a gear $Z_2$ which also meshes with gear $Z_3$ and which may be coupled with shaft 20 by way of a positive claw clutch $K_2$. The gear $Z_2$ forms with gear $Z_3$ a second propulsive connection with conversion ratio $i_2$.

The driven shaft 28 acts in conventional fashion on a differential of a motor vehicle not shown with a specified conversion ratio $i_D$. The aggregate conversion ratio of the motor vehicle is thus obtained from $$i_I(i_{II}) \times i_1 \times i_0$$

in the case of propulsion exclusively by the electric motor (direction of force flow from shaft 20 to shaft 12) and $$i_{II}(i_I) \times i_2 \times i_D$$

in the case of propulsion by the internal combustion engine and direction of force flow from shaft 12 to shaft 20.

The drive assembly described operates as follows:

If the motor vehicle is to be set in motion, coupling $L_3$ and $K_2$ are open and coupling $L_1$ is closed. The couplings are controlled by suitable hydraulic actuators, by way of an electronic control unit not shown which also controls the performance electronics of the electric motor 26 and is also connected to the control unit of the internal combustion engine 10.

If the motor vehicle is set in motion by means of the gas pedal not shown and an electronic control value transmitter mounted on this pedal, the force flow proceeds from the rotor 24 of the electric motor, by way of shaft 20 to the belt contact transmission 14 and from the latter, by way of infinitely variable transmission ratio $i_I$ to $i_{II}$, to the shaft 12, and from the latter, by way of gear set $Z_1$ and $Z_3$ with transmission ratio $i_1$, to the driven shaft 28. Since the transmission ratio $i_1$ is relatively small, the drive torque of the electric motor 26 is appropriately increased.

When the motor vehicle reaches a specific speed, 30 km/hr for example (in forward drive), the difference in conversion ratio between $i_1$ and $i_2$ is offset by the transmission ratio $I_{II}$ of the contact-belt transmission in effect at this time, so that the speed difference between shaft 20 and accordingly coupling $K_2$ and the gear $Z_2$ meshing with the gear $Z_3$ of the driven shaft 28 equals zero, that is, synchronous speed has been reached. Hence the coupling $K_2$ may be closed almost without wear and with no switching jerk.

Before the coupling $K_2$ is closed, however, the internal combustion engine is activated by ignition by closing of the coupling $L_3$ and its drive output is switched smoothly to the shaft 12. If necessary, any uncomfortable speed-change jerk may be eliminated by suitable adjustment of the torque values by control engineering means in conjunction with the electric motor 26.

After the output of the internal combustion engine 10 has been received and coupling $K_2$ has been closed, the multiple-disk coupling $L_1$ is opened, so that now the drive output is transmitted from combustion engine 10 to the shaft 12 and by way of the belt-contact transmission 14 operating at transmission ratio $i_{II}$ to the shaft 20 and by way of gear $Z_2$, with transmission ratio $I_2$, now connected to the shaft 20, to the driven shaft 28. The internal combustion engine now propels the motor vehicle fuel efficiently by way of the transmission ratio now present, such that $i_1 < i_2$ at reduced speed and accordingly with more lengthy transmission, into the overdrive range, that is, transmission ratio $i_I$ of the contact-belt transmission 14.

If high performance is required, the electric motor may be engaged for a short period to increase output. The electric motor is otherwise connected conventionally as a generator and, at least when the internal combustion engine 10 delivers excess power (especially in efficiency promoting partial load operation), supplies appropriate current to the vehicle network, that is, the drive batteries of the motor vehicle.

Figure 2:
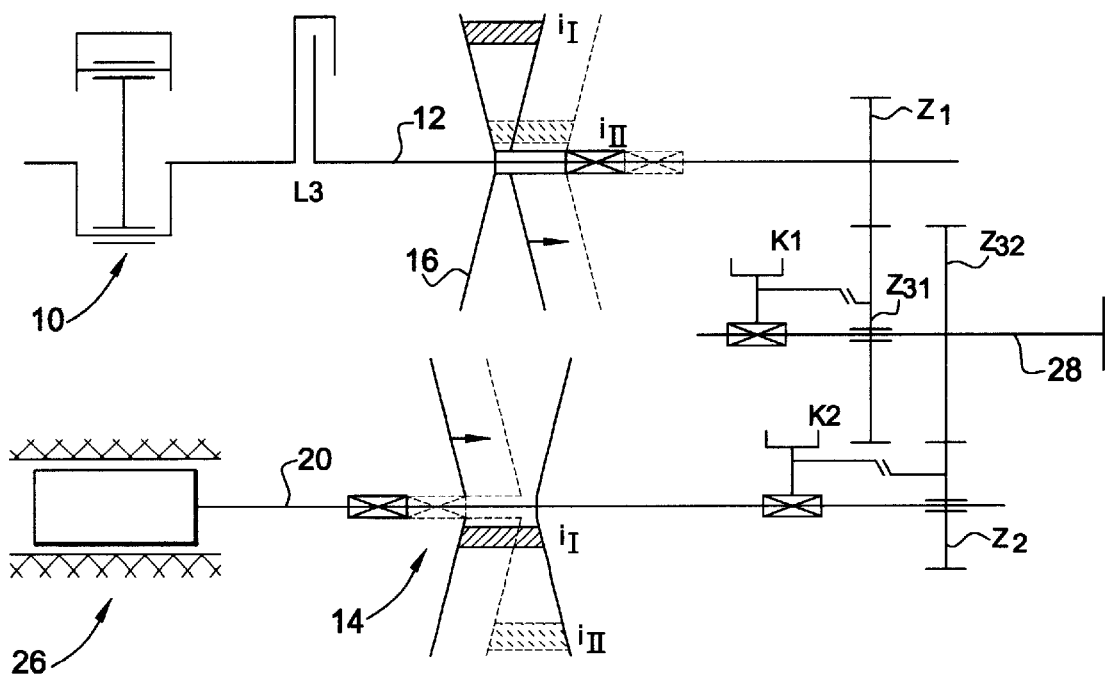
Figure 3:
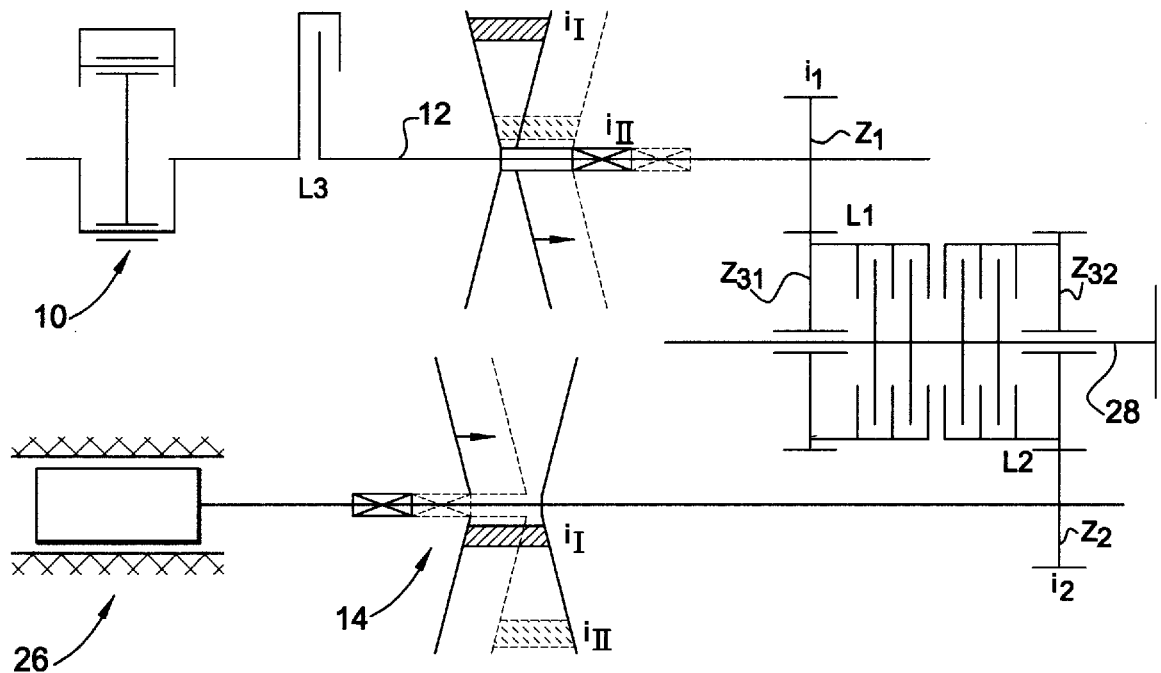

FIGS. 2 and 3 present alternative embodiments of the drive assembly shown in FIG. 1. Functionally equal parts are identified by the same reference numbers.

Thus, in FIGS. 2 and 3 two gears $Z_{31}$ and $Z_{32}$ are mounted on driven shaft 28 in place of a gear $Z_3$; they operate separately together with gears $Z_1$ or $Z_2$ to form transmission ratios $i_1$ and $i_2$. As a result, the different transmission ratios between $i_1$ and $i_2$ can be better realized by allowance for structural realities (shaft spacing, etc).

In addition, as is shown in FIG. 2 a form locking claw coupling $K_1$ may be used in place of the multiple-disk coupling $L_1$, as shown in FIG. 1, and is for this purpose mounted on the driven shaft 28.

FIG. 3 shows that couplings $K_1$ and $K_2$ may be in the form of hydraulically actuated multiple-disk couplings $L_1$ and $L_2$, both of which are for this purpose seated on the driven shaft 28. Hence this design is advantageous in that the hydraulic medium impinging on the multiple-disk clutches $L_1$ and $L_2$ may then be supplied by the driven shaft, while shafts 12, 20 may be used for supply of hydraulic fluid to disk pairs 16, 18.

Figure 4:
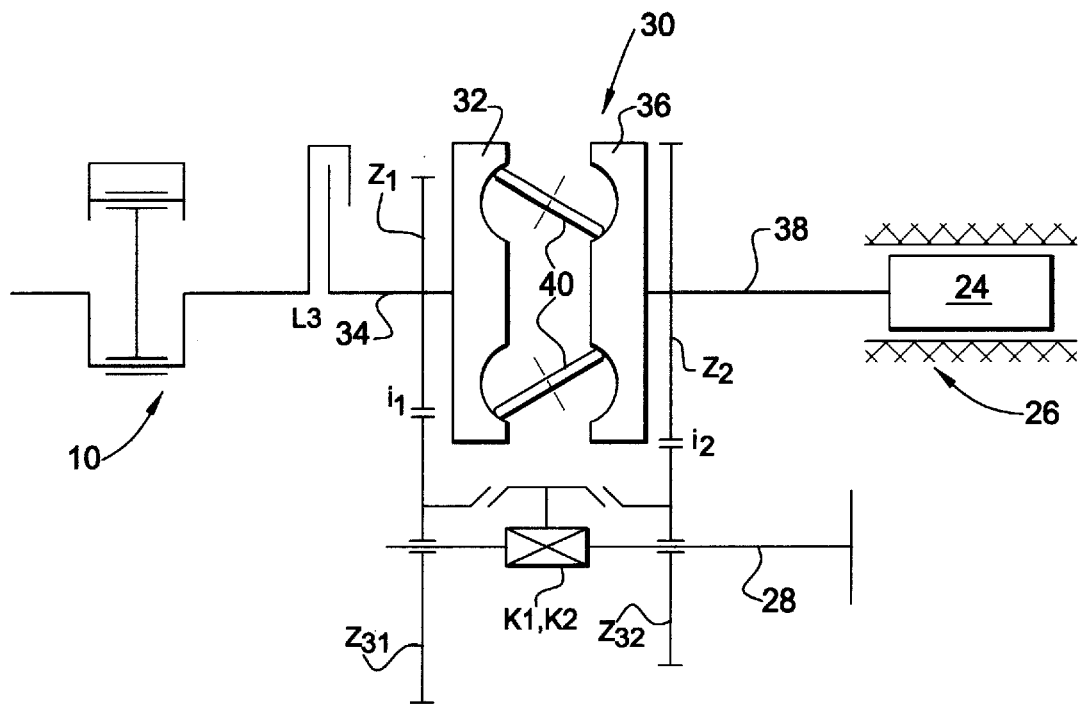

FIG. 4 shows as a modification of that presented in FIG. 1 a conventional toroidal transmission 30 as an infinitely variable transmission one converter element 32 of which is propulsively connected to the internal combustion engine 10 by coupling $L_3$ and shaft 34. The electric motor 26 acts directly on the other converter element 36 by way of shaft 38.

The transmission ratio $i_I$ or $i_{II}$ is controlled conventionally by rollers 40 which may be swung horizontally into position.

The gears $Z_1$ and $Z_2$ effecting the propulsive connections to driven shaft 28 mounted in parallel are mounted on shafts 34, 38, which mesh with the meshing gears $Z_{31}$ and $Z_{32}$ on the driven shaft 28 by ways of two form locking claw couplings $K_1$, $K_2$. The relation $i_1<i_2$ again applies.

The operation of the drive assembly shown in FIG. 4 corresponds to that of the drive assembly shown in FIG. 1. While use of a belt-contact transmission 14 as infinitely variable transmission results in a three-shaft design with shafts 12, 20, and 28, in the case of the drive assembly shown in FIG. 4, as determined by the design in the form of the toroidal transmission 30, shafts 34, 38 are oriented coaxially and only the driven shaft 28 is oriented parallel to them.

The drive assemblies described in the foregoing are illustrated in the form of sketches. Housing, shaft bearings, etc., may be of conventional transmission design. Reverse gear operation of the motor vehicle may be controlled by suitable polarity reversal of the electric motor 26. The speed of travel of the motor vehicle in reverse gear may be limited by the electronic control unit, for example, to 15 km/hr.

What is claimed is:

1. A drive assembly for motor vehicles with an internal combustion engine and an electric motor which actuate an infinitely variable transmission as speed converter, the internal combustion engine being engaged by way of a clutch and the electric motor being engaged directly on the transmission, characterized in that:

the internal combustion engine actuates a first shaft bearing a first converter element of the transmission, the electric motor actuates a second shaft bearing a second converter element of the transmission, and a driven shaft is provided which is coupled alternatively to the first shaft or to the second shaft.

2. A drive assembly as described in claim 1, wherein the driven shaft is coupled to the first shaft or to the second shaft by way of connectable gears.

3. A drive assembly as described in claim 1 or 2, wherein two propulsive connections differing in transmission ratio are provided, $i_1<i_2$ being applicable.

4. A drive assembly as described in claim 3, wherein the transmission ratios $i_1$, $i_2$ of the propulsive connection are coordinated so that, with a specific transmission ratio $i_I$, $i_{II}$ of the infinitely variable transmission, a synchronized speed value of the pertinent connectable drive elements is established on shifting from $i_1$ to $i_2$, or from $i_2$ to $i_1$.

5. A drive assembly as described in claim 3, wherein couplings for the propulsive connections are mounted adjacent to the converter elements of the infinitely variable transmission.

6. A drive assembly as described in claim 5, wherein at least one coupling of the connecting gears and propulsive connections is mounted on the driven shaft.

7. A drive assembly as described in claim 6, wherein at least one coupling in the force flow from the internal combustion engine to the driven shaft is a frictionally engaged coupling.

8. A process for operating a motor vehicle having an internal combustion engine engaged with an infinitely variable transmission via a clutch to actuate a first shaft, an electric motor directly engaged on the transmission to actuate a second shaft and a driven shaft that is alternatively engaged to the first or second shafts, wherein, when a gas pedal for the vehicle is actuated in a first operating mode, the electric motor is actuated and the driven shaft is engaged with the second shaft to propel the vehicle up to a predetermined speed, and when the gas pedal is actuated to propel the vehicle beyond the predetermined speed in a second operating mode, the internal combustion engine is actuated and the driven shaft is engaged with the first shaft to propel the vehicle.

9. A process as described in 8, wherein the predetermined speed defined for exclusive electromotive operation corresponds to a maximum speed permitted in specific street traffic areas.

10. A process as described in claim 8, wherein upon actuation of the gas pedal representing full acceleration of the vehicle in the first operational mode, the internal combustion engine is actuated and the driven shaft is engaged with the first shaft.

11. A process as described in claim 8, wherein during the second operating mode, the electric motor is activated and the second shaft engaged with the driven shaft to supply additional torque to the driven shaft.

12. A process as described in claim 8, wherein during the second operating mode, the electric motor is operated as a power generating device to supply the electric network of the motor vehicle.

13. A drive assembly for a motor vehicle with an internal combustion engine and an electric motor which actuate an infinitely variable transmission as speed converter, the internal combustion engine being engaged to a first shaft by way of a clutch and the electric motor being engaged directly on a second shaft, comprising:

a belt contact means disposed between the first and second shafts for transmitting torque between the shafts; and a driven shaft coupled alternatively to the first shaft or to the second shaft, wherein when the internal combustion engine powers the motor vehicle, the first shaft provides torque to the second shaft via the belt contact means and when the electric motor powers the motor vehicle, the second shaft provides torque to the first shaft via the belt contact means.

14. The drive assembly according to claim 13, wherein when the internal combustion engine powers the motor vehicle, the drive shaft is coupled to the first shaft and when the electric motor powers the motor vehicle, the drive shaft is coupled to the second shaft.

15. The drive assembly according to claim 13, wherein each of the first and second shafts comprise a corresponding pair of disks which contact the belt contact means.

16. The drive assembly according to claim 15, wherein the disks of each of the first and second shafts displace relative to each other along the axis of the first and second shafts respectively for altering a radius of contact with the belt contact means.

17. The drive assembly according to claim 16, wherein when the disks of one of the first and second shafts move relative to each other, the disks of the other of the first and second shafts move inversely relative to each other to maintain a constant tension of the belt contact means.

* * * * *

UNITED STATES PATENT AND TRADEMARK OFFICE
CERTIFICATE OF CORRECTION

PATENT NO.    : 6,491,602 B1
DATED         : December 10, 2002
INVENTOR(S)   : Bernd-Robert Hohn It is certified that error appears in the above-identified patent and that said Letters Patent is hereby corrected as shown below:

<u>Title page,</u>
Item [30], delete "199 1 370" and insert -- 199 15 370 -- in lieu thereof.

<u>Column 6,</u>
Line 46, delete "first" and insert -- second -- in lieu thereof.
Line 48, delete "second" and insert -- first -- in lieu thereof.

Signed and Sealed this

Third Day of June, 2003

JAMES E. ROGAN
*Director of the United States Patent and Trademark Office*